United States Patent
Wang et al.

(10) Patent No.: US 9,113,119 B2
(45) Date of Patent: Aug. 18, 2015

(54) METHOD AND SYSTEM FOR COLOR ADJUSTMENT

(75) Inventors: Lei Wang, Clovis, CA (US); Greg Millar, Coarsegold, CA (US); Farzin Aghdasi, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 800 days.

(21) Appl. No.: 13/331,622

(22) Filed: Dec. 20, 2011

(65) Prior Publication Data

US 2013/0155247 A1 Jun. 20, 2013

(51) Int. Cl.
*H04N 7/18* (2006.01)
*H04N 9/73* (2006.01)

(52) U.S. Cl.
CPC ..................... *H04N 9/735* (2013.01)

(58) Field of Classification Search
None
See application file for complete search history.

(56) References Cited

U.S. PATENT DOCUMENTS

| | | | |
|---|---|---|---|
| 2007/0140577 A1* | 6/2007 | Ahmed | 382/254 |
| 2009/0052776 A1* | 2/2009 | Panahpour Tehrani et al. | 382/167 |
| 2009/0147100 A1* | 6/2009 | Nagamasa et al. | 348/223.1 |
| 2009/0310859 A1 | 12/2009 | Lien et al. | |
| 2010/0194991 A1* | 8/2010 | Kim et al. | 348/655 |

OTHER PUBLICATIONS

Notification of the Transmittal of the International Search Report and the Written Opinion of the International Searching Authority for International Application No. PCT/US2012/070044, date of mailing Feb. 13, 2013.

International Preliminary Report on Patentability issued in International Application No. PCT/US2012/070044, entitled "Method and System for Color Adjustment" dated Jul. 3, 2014.

\* cited by examiner

*Primary Examiner* — Sath V Perungavoor
*Assistant Examiner* — Dakshesh Parikh
(74) *Attorney, Agent, or Firm* — Hamilton, Brook, Smith & Reynolds, P.C.

(57) ABSTRACT

A method of adjusting the color of images captured by a plurality of cameras comprises the steps of receiving a first image captured by a first camera from the plurality of cameras, analyzing the first image to separate the pixels in the first image into background pixels and foreground pixels, selecting pixels from the background pixels that have a color that is a shade of gray, determining the amount to adjust the colors of the selected pixels to move their colors towards true gray, and providing information for use in adjusting the color components of images from the plurality of cameras.

18 Claims, 6 Drawing Sheets

METHOD AND SYSTEM FOR COLOR ADJUSTMENT

BACKGROUND

Color features play a very important role in the analysis performed by intelligent surveillance systems, such as in forensic searches using various analytics and algorithms. These systems sometimes utilize a large number of cameras. A challenging issue in the analysis performed by these intelligent systems is finding the best matches of objects with similar colors. For example, in order to make sure the objects tracked across cameras are the same objects, color features of the objects are compared. Only objects with similar color features are considered matched objects and are tracked across cameras in the system. In the case of forensic searches where an exemplary object is provided for the search, the system identifies objects with similar color features and provides them as search results.

In these exemplary applications, as well as others, color matching presents a significant challenge. The color temperatures of the cameras in the system may be different due to the color gain adjustment in the white balance processing. In general, proper camera white balancing takes the "color temperature" of a light source into account, which refers to the relative warmth or coolness of white light. Digital cameras can create blue, red, or even green color casts to the image captured by the camera. Since the cameras monitoring even the same field of view may use different white balance parameters and generate images with different color temperature, it is possible that the colors of the same object are dramatically different from camera to camera. Accordingly, there has been a need in the industry for a method and system of providing consistent color of an object across cameras in the system to facilitate analysis of the objects.

SUMMARY

An example of a method of adjusting the color of images captured by a plurality of cameras includes the steps of receiving a first image captured by a first camera from the plurality of cameras, analyzing the first image to separate the pixels in the first image into background pixels and foreground pixels, selecting pixels from the background pixels that have a color that is a shade of gray, determining the amount to adjust the colors of the selected pixels to move their colors towards true gray, and providing information for use in adjusting the color components of images from the plurality of cameras.

Implementation of such a method may include one or more of the following features. The selecting step includes selecting a range of pixels wherein true gray is included in the selected range. The determining step includes determining the maximum bins in the histograms of the Cb and Cr components of the selected pixels. The determining step includes determining the mean colors for the color components of the selected pixels. The method further includes the step of adjusting the color of the plurality of cameras by using the provided information. The method further includes the step of determining an overlap region in the field of views of the plurality of cameras, and wherein the selecting step includes selecting pixels from the background pixels that have a color that is a shade of gray and are located in an overlap area, the determining step includes determining the amount to adjust the color of the selected pixels in the overlap area to move their colors towards true gray and the method further comprises the step of adjusting the white balance of cameras in the plurality of cameras having an overlap area based on the determined adjustment amount.

An example of a system for adjusting the color of images captured by a plurality of cameras includes a network, a plurality of cameras connected to the network, and a processor connected to the network and being adapted to receive a first image captured by a first camera from the plurality of cameras, to analyze the first image to separate the pixels in the first image into background pixels and foreground pixels to select pixels from the background pixels that have a color that is a shade of gray, to determine the amount to adjust the colors of the selected pixels to move their colors towards true gray, and to provide information for use in adjusting the color components of images from the plurality of cameras.

Implementation of such a method may include one or more of the following features. The processor is adapted to select a range of pixels wherein true gray is included in the selected range. The processor is adapted to determine the maximum bins in the histograms of the Cb and Cr components of the selected pixels. The processor is adapted to determine the mean colors for the color components of the selected pixels. The processor is adapted to adjust the color of the plurality of cameras by using the provided information. The first camera has a first field of view and a second camera from the plurality of cameras has a second field of view and the second field of view has an overlap region with the first field of view, and the processor is adapted to determine an overlap region in the field of views of the plurality of cameras, to select pixels from the background pixels that have a color that is a shade of gray and are located in an overlap area, to determine the amount to adjust the color of the selected pixels in the overlap area to move their colors towards true gray, and to adjust the white balance of cameras in the plurality of cameras having an overlap area based on the determined adjustment amount.

An example of a non-transitory computer readable medium includes instructions configured to cause a processor to receive a first image captured by a first camera from a plurality of cameras, to analyze the first image to separate the pixels in the first image into background pixels and foreground pixels; to select pixels from the background pixels that have a color that is a shade of gray; to determine the amount to adjust the colors of the selected pixels to move their colors towards true gray; and to provide information for use in adjusting the color components of images from the plurality of cameras.

Implementation of such a non-transitory computer medium may include one or more of the following features. The instructions to cause a processor to select pixels from the background pixels that have a color that is a shade of gray include instructions to cause a processor to select a range of pixels wherein true gray is included in the selected range. The instructions to cause a processor to determine the amount to adjust the colors of the selected pixels to move their colors towards true gray include instructions to cause a processor to determine the maximum bins in the histograms of the Cb and Cr components of the selected pixels. The instructions to cause a processor to determine the amount to adjust the colors of the selected pixels to move their colors towards true gray include instructions to cause a processor to determine the mean colors for the color components of the selected pixels. The non-transitory computer readable medium includes further instructions to cause a processor to adjust the color of the plurality of cameras by using the provided information. The non-transitory computer readable medium includes further instructions to cause a processor to determine an overlap region in the field of views of the plurality of cameras, and wherein the instructions to cause a processor to select pixels from the background pixels that have a color that is a shade of gray include instructions to cause a processor to select pixels from the background pixels that have a color that is a shade of gray and are located in an overlap area, the instructions to cause a processor to determine the amount to adjust the colors of the selected pixels to move their colors towards true gray include instructions to cause a processor to determine the amount to adjust the color of the selected pixels in the overlap area to move their colors towards true gray and further includes instructions to cause a processor to adjust the white balance of cameras in the plurality of cameras having an overlap area based on the determined adjustment amount.

The processes and systems described herein, and the attendant advantages, applications, and features thereof, will be more fully understood by a review of the following detailed description, figures, and claims.

DETAILED DESCRIPTION

Figure 1:
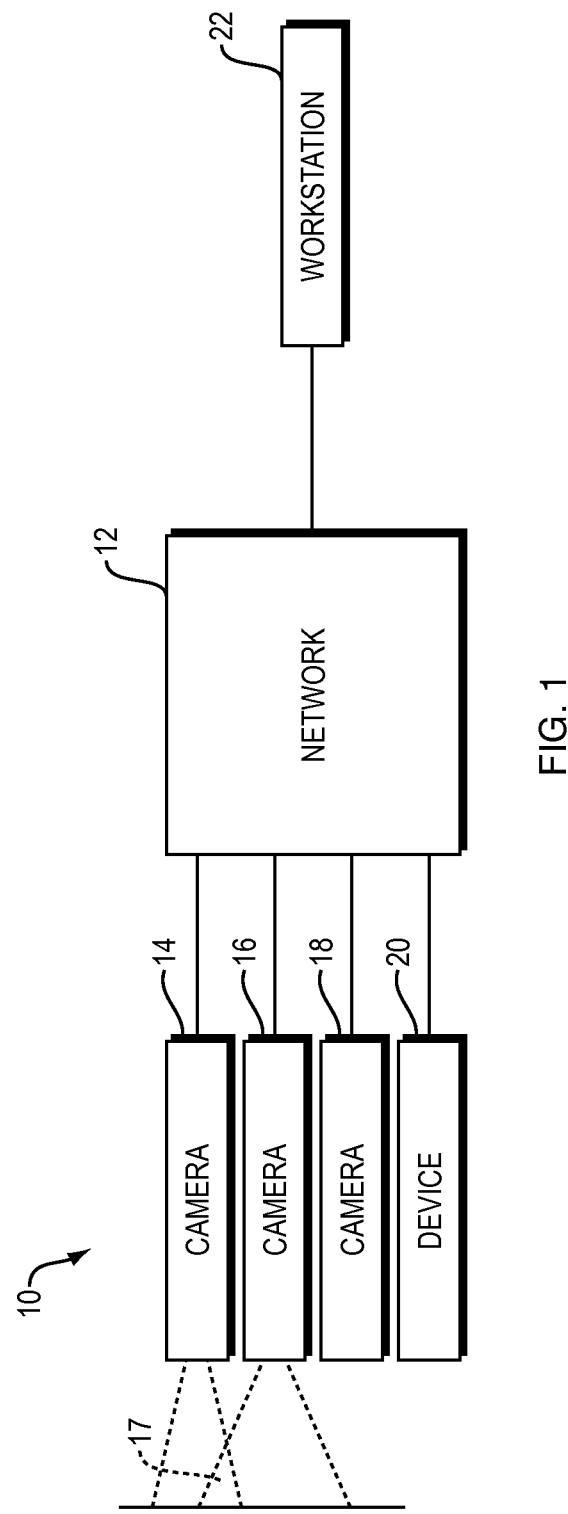
FIG. 1 is a block diagram of one embodiment of a surveillance system in which various aspects of providing consistent color across cameras in the system can be implemented.

Referring to FIG. 1, a video surveillance system 10 has a network 12 which can be a closed network, local area network, or wide area network, such as the Internet. A plurality of cameras 14, 16, and 18 are connected to network 12 by a wired or wireless connection to provide real-time video streams. Workstation 22, which can be, for example, a control point in surveillance system 10, a server, a digital video recorder, a personal computer or a user logged into surveillance system 10 by means of a laptop computer, is connected to network 12 via a wired or wireless connection. Cameras 14, 16, and 18 provide video streams to workstation 22 via network 12. Device 20 is connected to network 12 and can be another workstation, control point, network manager, system storage or other suitable device. One or more of cameras 14, 16, and 18 can be a movable camera, such as a PTZ camera that allows a user to adjust the pan, tilt, and zoom of the camera. In addition, one or more of cameras 14, 16, and 18 can have their own processor and storage for performing analytics and algorithms on their respective video streams. Surveillance system 10 can be configured as a distributed system where the system control and processing of data is performed by various devices such as workstation 22 and device 20, or surveillance system 10 can be configured as a host computer system where, for example, workstation 22 can be the host. The cameras in surveillance system 10 can have separate fields of view, or they may overlap as shown by overlap area 17.

Figure 2:
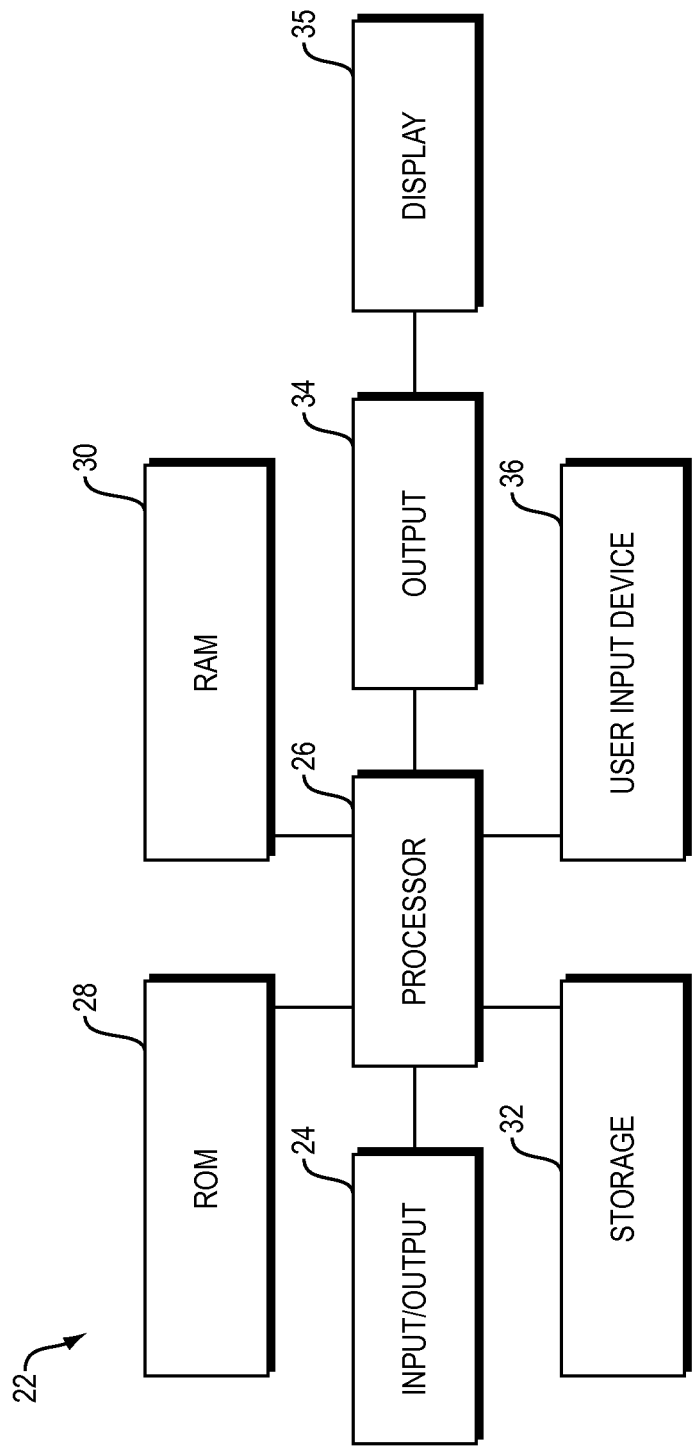
FIG. 2 is an exemplary block diagram of one embodiment of a workstation for use in the surveillance system shown in FIG. 1.

With reference to FIG. 2, one embodiment of an exemplary workstation for performing various aspects of configuring a camera is shown in block diagram form. Workstation 22 has a central or host processor 26 which is connected to input/output 24, ROM 28, RAM 30, video display 35, storage 32, output 34, and user input device 36. User input device 36 can be a keyboard, mouse, controller, or other suitable input device. Processor 26 implements algorithms and programs that are stored in ROM 28, storage 32, which could be a disk drive for example, or in storage located elsewhere in surveillance system 10, such as device 20, in response to user input from user input device 36 and provides output signals to display 35. Input/output 24 is connected to network 12 to receive the video streams from cameras 14, 16, and 18, and to send configuration and control signals to cameras 14, 16, and 18 in FIG. 1. In addition, input/output 24 also can receive signals from device 20, such as the algorithms to implement various aspects of forensic searching on the video streams received from one or more of cameras 14, 16, and 18. The programs and algorithms stored, for example, in storage 32 are loaded at run time to enable a user to conduct forensic searches utilizing algorithms to analyze the video streams received over network 12 by interacting with the graphical user interface on display 35 with user input device 36. The results of the forensic search performed by processor 26 can be displayed on display 35.

Figure 3:
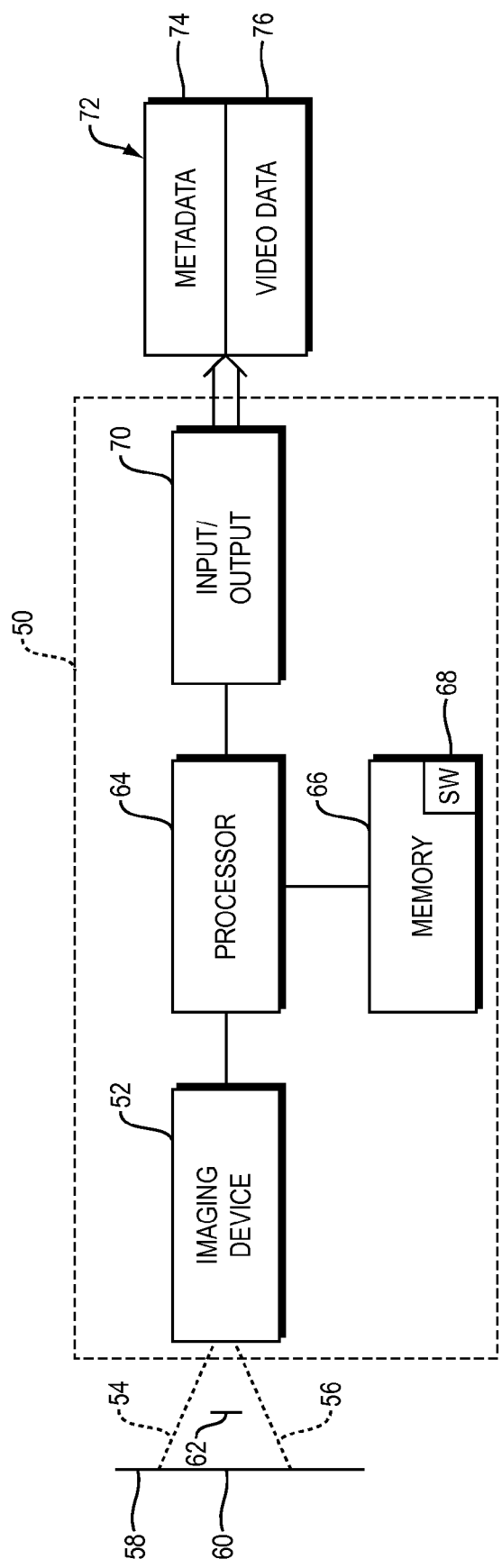
FIG. 3 is an exemplary block diagram of one embodiment of a camera for use in the surveillance system shown in FIG. 1.

Referring to FIG. 3, an embodiment of an exemplary camera 50 is illustrated. The embodiment of camera 50 could be implemented in one or more of cameras 14, 16, and 18. Although camera 50 is shown as a single unit having multiple functions contained therein, other embodiments could include a plurality of discrete units implementing one or more functions. Camera 50 has an imaging device 52 which would include, for example, a lens and image sensor. Imaging device 52 has a field of view illustrated as defined by dotted lines 54 and 56. Line 58 illustrates an object plane having a background within the field of view and line 62 illustrates an object of interest in the foreground, such as a person walking Imaging device 52 is connected to processor 64 and provides the output of its imaging sensor to processor 64. Processor 64 is connected to memory 66 which can be comprised of any suitable data storage such as, for example, RAM, ROM, magnetic disk drive or optical disk drive.

Memory 66 contains software indicated by block 68 which provides various algorithms that are used by processor 64 to analyze the video stream provided by imaging device 52. For example, as frames of the field of view of camera 50 are captured, these frames are processed by processor 64 in accordance with the methods provided by the software algorithms and analytics stored in memory 66 to determine if one or more moving objects are present. An exemplary method might use a Gaussian mixture model to separate a foreground that contains images of moving objects from a background that contains images of static objects, such as trees, buildings, and roads. The images of these moving objects are then processed to identify various characteristics of the images of the moving objects, such as color.

Using the images of the moving objects, processor 64 creates metadata associated with the images of each moving object in the respective video frames. Metadata associated with or linked to, an object contains information regarding various characteristics of the images of the object. For example, the metadata may include information on characteristics such as location of the object, height of the object, width of the object, direction the object is moving, the speed the object is moving, color of the object, and a categorical classification of the object, for example, person or vehicle.

Input/output 70 which is connected to processor 64 interfaces with the network or other communication channel to provide the camera output illustrated as frame 72. Frame 72 comprises metadata 74 and video data 76. The metadata is stored in a data file either associated with or linked to the video data. The metadata can be utilized by, for example, workstation 22 to conduct forensic analysis of the video images provided by one or more of the cameras in surveillance system 10. These searches can include complex analysis involving a plurality of cameras in the system, such as tracking an object as it moves about the site monitored by the system so that images of a moving object may captured by multiple cameras in the system at the same point in time or at different points in time.

One exemplary embodiment for implementing the techniques described herein utilizes a color space such as YCbCr (where Y is luminance, Cb is the blue-difference chroma component and Cr is the red-difference chroma component), RGB (where R is the red component, G is the green component, and B is the blue component), HSV (where H is the hue, S is the saturation and V is the brightness value), or other suitable color spaces. An exemplary implementation is described below with reference to the YCbCr color space.

The video frames captured by a camera are processed with algorithms and analytics as discussed above to extract a moving object from the still background and to track the moving object. The pixels are classified as foreground or background pixels depending on their similarity with the background model. The foreground pixels are the pixels from moving objects in the scene. These foreground pixels are ignored in the following analysis since they may drift the color parameters due to the different appearance of them as the object moves within the scene.

Within the background pixels, the pixels that satisfy certain criteria are considered grayish pixels. For all the pixels, $P_i$, in the YCbCr color space, where $P_i$ is defined as $P_i=(Y_i,Cb_i,Cr_i)$, the grayish pixels are defined as the set of pixels $\{P_j|Y_j>t_{ymin}\&Y_j<t_{ymax}\&Cb_j>t_{cmin}\&Cb_j<t_{cmax}\&Cr_j>t_{cmin}\&Cr_j<t_{cmax}\}$ Where $t_{y\ min}$ and $t_{y\ max}$ are the minimal and maximal thresholds for intensity channels, and $t_{c\ min}$ and $t_{c\ max}$ are the thresholds for color channels. A heuristic search method can be used to determine the thresholds for the color channels. Initially $t_{c\ min}$ is set to 120, and $t_{c\ max}$ is set to 136. The background pixels are scanned to determine the number of grayish pixels. If the number of grayish pixels is greater than a threshold, for example, 1% of the total background pixels, the search is stopped. If the number of grayish pixels is less than the threshold, $t_{c\ min}$ is reduced and $t_{c\ max}$ is increased by a step of; for example, 4, and the scan is performed again until the grayish pixel number fulfills the stop threshold criteria. Hard bounds can be set for $t_{c\ min}$ at 112 and $t_{c\ max}$ at 144 to avoid the selection of false grayish colors, i.e., the colors that are not grayish. Preferred thresholds are $t_{c\ min}$ at 120 and $t_{c\ max}$ at 136. The thresholds for the intensity channels can also be determined by a heuristic method, and suitable values for $t_{y\ man}$ and $t_{y\ max}$ can be, for example, 50 and 220 respectively. The thresholds for different color channels can be different. For different color temperatures, the Cb and Cr channels are drifted toward different directions, and the thresholds are adjusted accordingly. The intensity thresholds ensure that pixels that are too dark or too bright are not included since these often contain distorted colors. The color thresholds ensure that pixels with significant colors, i.e., colors that are rich in color and are not grayish, are not included.

Figure 4:
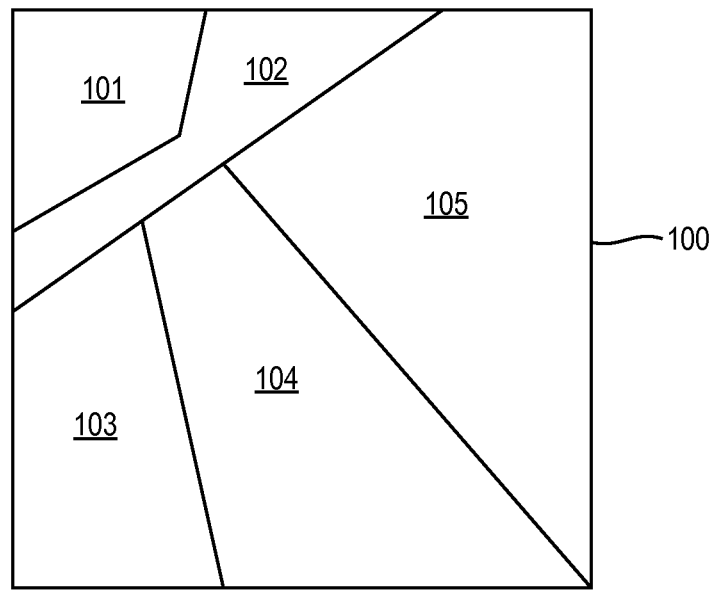
FIG. 4 is a simplified, exemplary illustration of an image captured by a camera.
Figure 5:
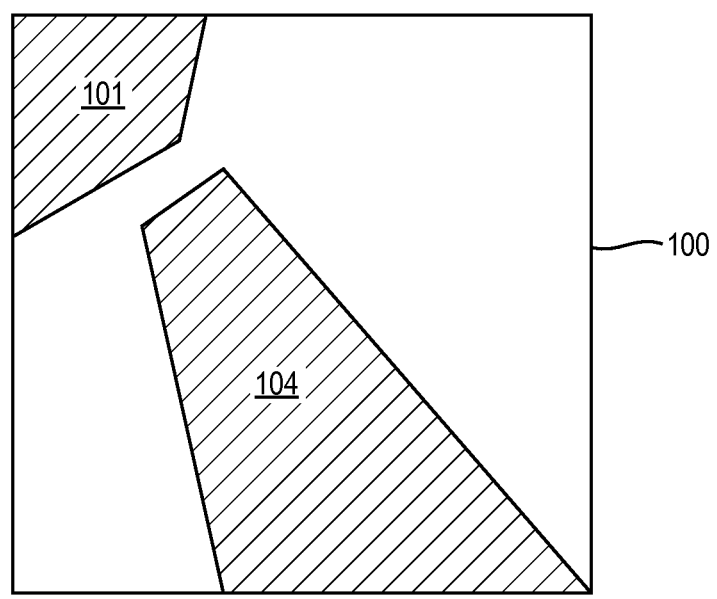
FIG. 5 is an exemplary illustration of the areas chosen for the analysis from FIG. 4.

FIG. 4 is a simplified illustration of an image 100 captured by a camera. Image 100 has a plurality of areas 101, through 105 which illustrate areas of the captured image that have different colors. In this illustration, it is assumed that areas 101 and 104 are areas that have different shades of gray, and 103 through 105 are other colors such as blue, brown, green, and so forth or a plurality or blend of different colors in an area. Areas 101 and 104 may also have varying shades of gray. FIG. 5 illustrates the areas that are chosen for the analysis, that is, the grayish pixels automatically selected with the formula above. These areas have been indicated with cross-hatching to illustrate that only these areas are considered in the analysis. It should be noted that in an actual application there will typically be numerous areas in the captured image that have a shade of gray. The illustration in FIG. 4 has been simplified to facilitate the explanation of the exemplary method.

Figure 6:
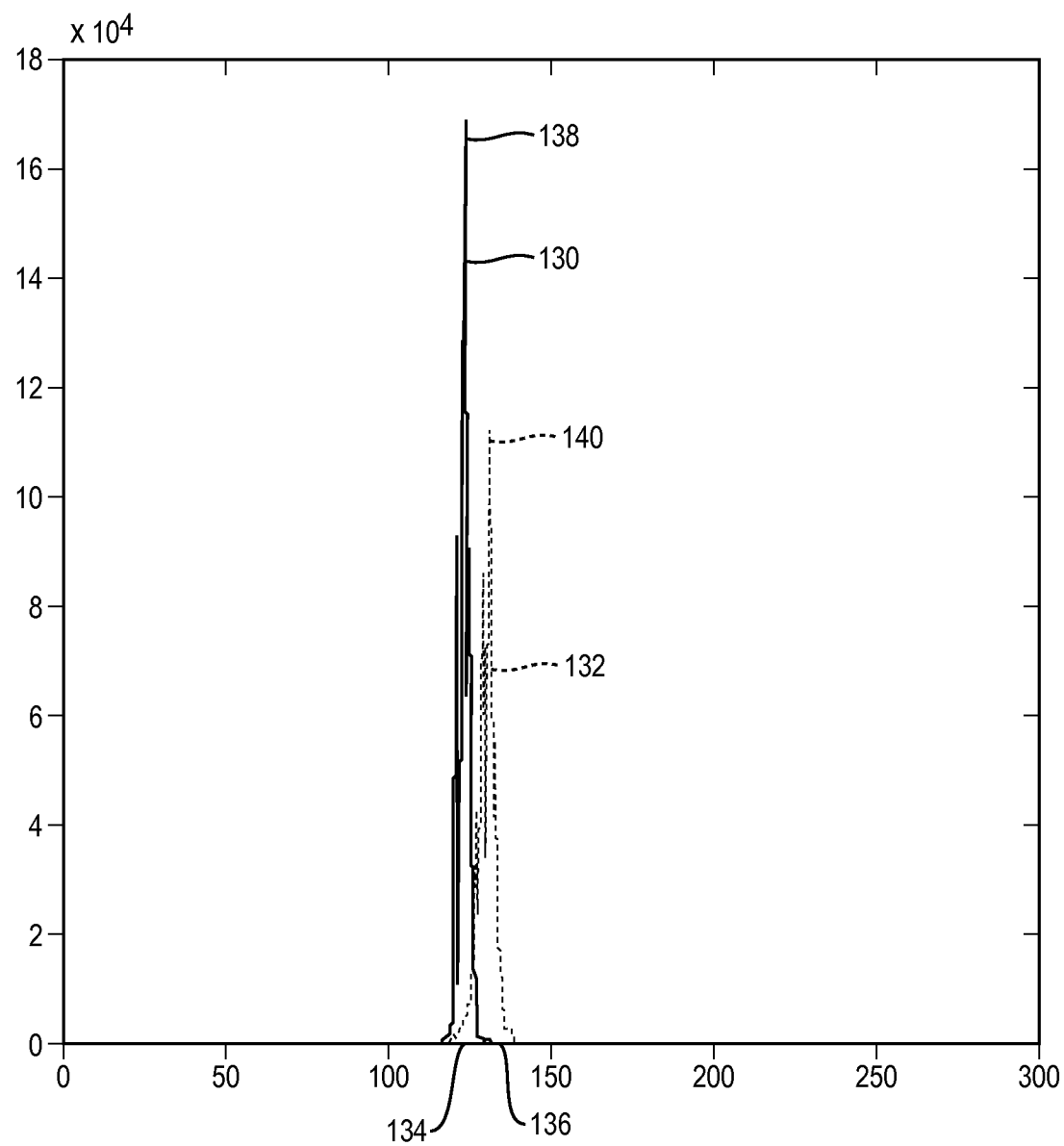
FIG. 6 is an illustration of an exemplary histogram for the areas chosen for analysis in FIG. 5.

An illustration of exemplary histograms $H_{Cb}$ and $H_{Cr}$ of the grayish pixels in the Cb and Cr components from the selected grayish pixels illustrated in FIG. 5 are shown in FIG. 6. The pixel value from 0 to 255 is shown on the horizontal axis, and the pixel number is shown on the vertical axis. The line indicated by numeral 130 is the exemplary histogram of the Cr channel, and the line indicated by numeral 132 is the exemplary histogram of the Cb channel. A true gray pixel will have a value of 128 in the Cb and Cr channels. The next step in the method of this embodiment is to determine the amount to adjust or correct the colors in order to make the Cb and Cr channels of the selected grayish pixels adjusted towards 128 via a probability distribution measurement. Since the grayish colors are distributed around 128 but are not exactly at 128, the probability center of the distribution of the CB and Cr histograms are moved to 128. The term grayish means that the appearance of the pixels are not blueish, redish, or greenish, but rather look like gray. The correction or adjustment amount can be determined by different methods.

A first exemplary method for determining the amount to correct the colors in order to make the grayish pixels more "grayish" is to find the maximal bins $k_{Cb}$ and $K_{Cr}$ which are illustrated by numerals 134 and 136 respectively, which coincide with peaks 138 and 140 respectively in the histograms in FIG. 6, and then adjust them to 128. Exemplary first equations for correcting the colors can be expressed as follows:

$$Cb'_j = Cb_j \frac{128}{k_{Cb}}$$

and $$Cr'_j = Cr_j \frac{128}{k_{Cr}}.$$

Exemplary second equations for correcting the colors can be expressed as follows:

$Cb'_j=Cb_j+(128-k_{Cb})$ and $Cr'=Cr_j+(128-k_{Cr})$.

A second exemplary method for determining the amount to correct the colors in order to make the grayish pixels to be more "grayish" is to find the mean values of colors $m_{Cb}$ and $m_{Cr}$ from the histograms as follows:

$$m_{Cb} = \sum_{k=0}^{255} p_k^{Cb} H_{Cb}(k)$$

and $$m_{Cr} = \sum_{k=0}^{255} p_k^{Cr} H_{Cr}(k).$$

First exemplary equations to correct the colors using the mean values of color from the histograms can be expressed as follows:

$$Cb'_j = Cb_j \frac{128}{m_{Cb}}$$

and $$Cr'_j = Cr_j \frac{128}{m_{Cr}}.$$

Second exemplary equations to correct the colors using the mean values of color from the histograms can be expressed as follows:

$$Cb''_j = Cb_j + (128 - m_{Cb})$$

and $$Cr''_j = Cr_j + (128 - m_{Cr}).$$

Figure 7:
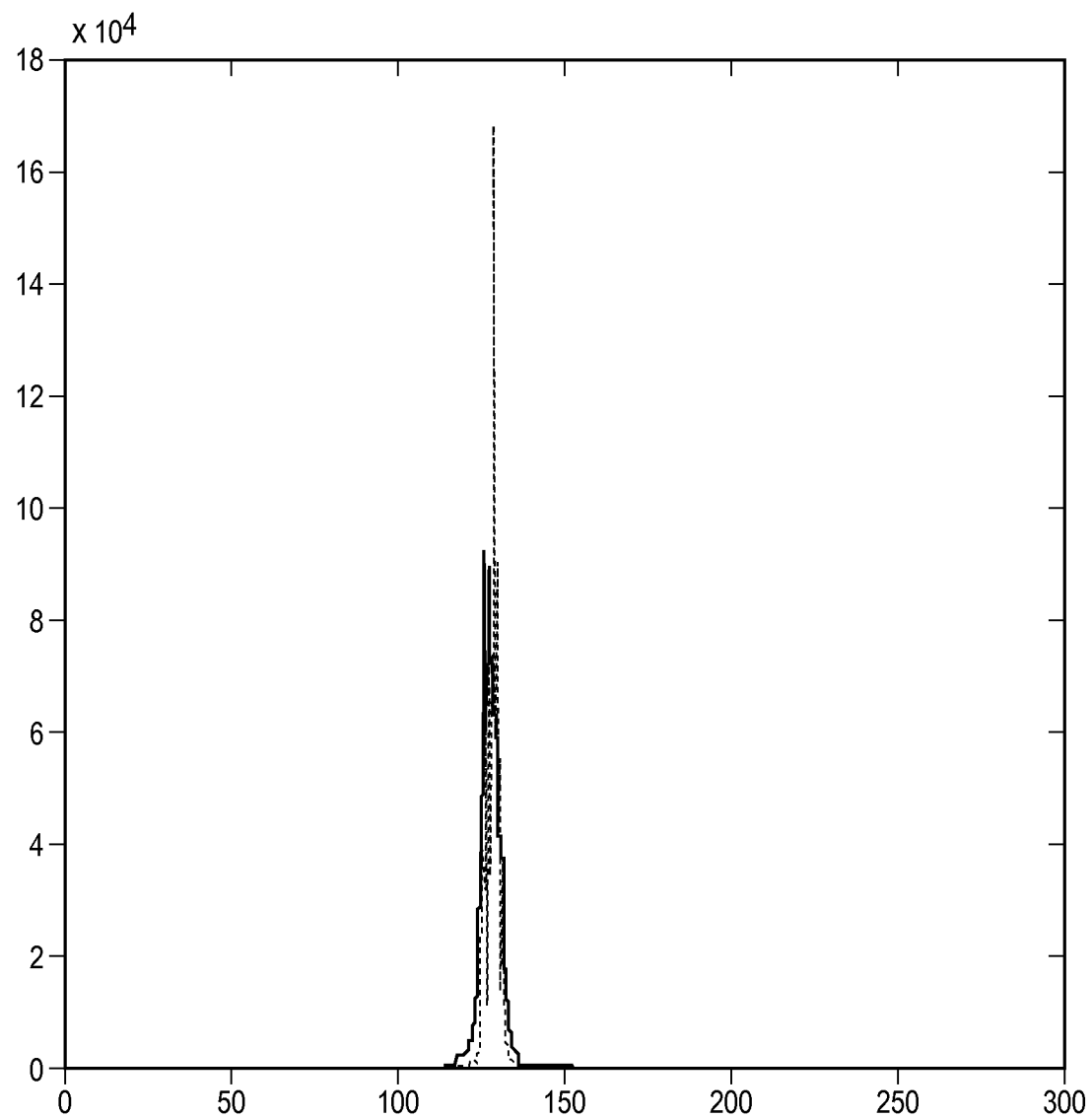
FIG. 7 is an illustration of an exemplary histogram after color adjustment.

The original image is then adjusted using, for example, one of the foregoing methods. FIG. 7 illustrates exemplary adjusted histograms for the grayish pixels shown in FIG. 6.

Processor 64 of camera 50 will send out information about moving objects with their locations, sizes, color features such as average colors or dominant colors of the objects as scene description in the metadata. With this exemplary embodiment of the color adjustment method, the color parameters ($k_{Cb}$, $k_{Cr}$) or ($m_{Cb}$, $m_{Cr}$) will also be included into the scene description as a part of color description of the scene. At the server side, the received metadata are parsed, and the color features can be adjusted based on these values. For example, if we extract color features of Cb and Cr components in the direct cosine transform (DCT) frequency domain, the dc components of Cb and Cr can be adjusted with the equations discussed above. With these adjusted color features, object matching and forensic searches can provide more consistent results across the cameras.

The color adjustment method can also be applied to unify the white balance across cameras if the cameras have overlapped areas, such as overlap area 17 of cameras 16 and 18 in FIG. 1. An image registration algorithm such as Scale-Invariant Feature Transform (SIFT), Speeded Up Robust Feature (SURF), or Affine-SIFT (ASIFT) can be applied to determine correspondence of feature points between the cameras. With the perspective transform parameters that can be determined from the point correspondence, the grayish pixels of the common areas between the cameras can be located. The white balance can be done based on the color parameters ($k_{Cb}$, $k_{Cr}$) or ($m_{Cb}$, $m_{Cr}$) of the common area using equations set forth above.

The processes and methods described and shown herein can be stored on a non-transitory computer readable medium, which refers to any non-transitory storage device used for storing data accessible by a computer, for example, a magnetic hard disk, a floppy disk, an optical disk, such as a CD-ROM or a DVD, a magnetic tape, a memory chip, and a carrier wave which may be in the form of electromagnetic signals, acoustic signals, optical signals and other like earner waves on which instructions can be encoded in accordance with various configurations of the invention. The computer readable medium may be separate from the computer system and may be provided in an installation package such that the computer readable medium may be used to program, configure and adapt a general purpose computer with the instructions and code stored thereon. These instructions might take the form of executable code which is executable by the computer system and may take the form of source code or installable code, which upon compilation and installation on the computer system, for example, using any of a variety of generally available compilers, installation programs, compression utilities, decompression utilities, and so forth, then takes the form of executable code.

Although the various embodiments discussed herein have pertained to a video surveillance system, the same processes and methods can be utilized with cameras and video data captured by commercial and noncommercial systems outside of the surveillance environment.

Other examples of configuration and implementation are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including the claims, "or" as used in a list of items prefaced by "at least one of" indicates a disjunctive list such that, for example, a list of "at least one of A, B, or C" means A or B or C or AB or AC or BC or ABC (i.e., A and B and C). In addition, it is to be understood that more than one invention may be disclosed herein.

What is claimed is:

1. A method of adjusting the color of images captured by a plurality of cameras comprising: receiving a first image captured by a first camera from the plurality of cameras; analyzing the first image to separate pixels in the first image into background pixels and foreground pixels; selecting pixels from the background pixels that have a color that is a shade of gray; determining the amount to adjust the colors of the selected pixels to move their colors towards true gray; and providing the determined adjustment amount for use in adjusting the color components of images from the plurality of cameras.

2. A method as recited in claim 1 wherein selecting pixels from the background pixels comprises selecting a range of pixels wherein true gray is included in the selected range.

3. A method as recited in claim 1 wherein determining the amount to adjust colors of the selected pixels to move their colors towards true gray comprises determining the maximum bins in the histograms of the Cb and Cr components of the selected pixels.

4. A method as recited in claim 1 wherein determining the amount to adjust colors of the selected pixels to move their colors towards true gray comprises determining the mean colors for the color components of the selected pixels.

5. A method as recited in claim 1 further comprising adjusting the color of the plurality of cameras by using the provided adjustment amount.

6. A method as recited in claim 1 further comprising determining an overlap region in the field of views of the plurality of cameras, and wherein selecting pixels from the background pixels comprises selecting pixels from the background pixels that have a color that is a shade of gray and are located in an overlap area, determining the amount to adjust the colors of the selected pixels to move their colors towards true gray comprises adjusting the white balance of cameras in the plurality of cameras having an overlap area based on the determined adjustment amount.

7. A system for adjusting the color of images captured by a plurality of cameras comprising: a network; a plurality of cameras connected to the network; and a processor connected to the network and being adapted to receive a first image captured by a first camera from the plurality of cameras, to analyze the first image to separate the pixels in the first image into background pixels and foreground pixels to select pixels from the background pixels that have a color that is a shade of gray, to determine the amount to adjust the colors of the selected pixels to move their colors towards true gray, and to provide the determined adjustment amount for use in adjusting the color components of images from the plurality of cameras.

8. A system as recited in claim 7 wherein the processor is adapted to select a range of pixels wherein true gray is included in the selected range.

9. A system as recited in claim 7 wherein the processor is adapted to determine the maximum bins in the histograms of the Cb and Cr components of the selected pixels.

10. A system as recited in claim 7 wherein the processor is adapted to determine the mean colors for the color components of the selected pixels.

11. A system as recited in claim 7 wherein the processor is adapted to adjust the color of the plurality of cameras by using the provided information.

12. A system as recited in claim 7 wherein the first camera has a first field of view and a second camera from the plurality of cameras has a second field of view and the second field of view has an overlap region with the first field of view and the processor is adapted to determine an overlap region in the field of views of the plurality of cameras, to select pixels from the background pixels that have a color that is a shade of gray and are located in an overlap area, to determine the amount to adjust the color of the selected pixels in the overlap plurality of cameras having an overlap area based on the determined adjustment amount.

13. A non-transitory computer readable medium comprising instructions configured to cause a processor to: receive a first image captured by a first camera from a plurality of cameras; to analyze the first image to separate the pixels in the first image into background pixels and foreground pixels; to select pixels from the background pixels that have a color that is a shade of gray; to determine the amount to adjust the colors of the selected pixels to move their colors towards true gray; and to provide the determined adjustment amount for use in adjusting the color components of images from the plurality of cameras.

14. A non-transitory computer readable medium as recited in claim 13 wherein the instructions to cause a processor to select pixels from the background pixels that have a color that is a shade of gray comprise instructions to cause a processor to select a range of pixels wherein true gray is included in the selected range.

15. A non-transitory computer readable medium as recited in claim 13 wherein the instructions to cause a processor to determine the amount to adjust the colors of the selected pixels to move their colors towards true gray comprise instructions to cause a processor to determine the maximum bins in the histograms of the Cb and Cr components of the selected pixels.

16. A non-transitory computer readable medium as recited in claim 13 wherein the instructions to cause a processor to determine the amount to adjust the colors of the selected pixels to move their colors towards true gray comprise instructions to cause a processor to determine the mean colors for the color components of the selected pixels.

17. A non-transitory computer readable medium as recited in claim 13 further comprising instructions to cause a processor to adjust the color of the plurality of cameras by using the provided information.

18. A non-transitory computer readable medium as recited in claim 13 further comprising instructions to cause a processor to determine an overlap region in the field of views of the plurality of cameras, and wherein the instructions to cause a processor to select pixels from the background pixels that have a color that is a shade of gray comprise instructions to cause a processor to select pixels from the background pixels that have a color that is a shade of gray and are located in an overlap area, the instructions to cause a processor to determine the amount to adjust the colors of the selected pixels to move their colors towards true gray comprise instructions to cause a processor to determine the amount to adjust the color of the selected pixels in the overlap area to move their colors towards true gray and further comprise instructions to cause a processor to adjust the white balance of cameras in the plurality of cameras having an overlap area based on the determined adjustment amount.

* * * * *